United States Patent [19]

Hendel et al.

[11] Patent Number: 5,003,486

[45] Date of Patent: Mar. 26, 1991

[54] PROGRAMMABLE SAFETY ELECTRICAL SOCKET CONTROLLER

[75] Inventors: Mordechai Hendel, Kibbutz Mishmar Hasharon; Yves Villaret, Kibbutz Ein Hachoresh, both of Israel

[73] Assignee: Nero Technologies Ltd., Israel

[21] Appl. No.: 315,924

[22] Filed: Feb. 24, 1989

[51] Int. Cl.$^5$ .................. G06F 15/20; G01R 31/08
[52] U.S. Cl. .................. 364/483; 200/51.09; 324/525; 340/573; 340/656; 364/482; 364/481
[58] Field of Search ............... 364/480–483; 200/51.09, 43.01; 340/573, 650, 656; 324/65 R, 415, 525, 524, 523

[56] References Cited

U.S. PATENT DOCUMENTS

| | | | |
|---|---|---|---|
| 2,735,906 | 2/1956 | Avrunin | 200/51.09 |
| 3,579,171 | 5/1971 | Woodward | 200/51.09 |
| 3,596,019 | 7/1971 | Koester | 200/51.09 |
| 3,699,285 | 10/1972 | Leatherman | 200/51.09 |
| 3,895,195 | 7/1975 | Morrison et al. | 200/51.09 |
| 3,915,536 | 10/1975 | Glantz | 439/188 |
| 4,093,336 | 6/1978 | Rose | 200/51.09 |
| 4,148,536 | 4/1979 | Petropoulsos et al. | 200/51.09 |
| 4,152,557 | 5/1979 | Busch et al. | 200/51.09 |
| 4,179,175 | 12/1979 | Farnworth et al. | 200/51.09 |
| 4,271,337 | 6/1981 | Barkas | 200/51.09 |
| 4,312,109 | 1/1982 | Kawana et al. | 364/480 |
| 4,630,228 | 12/1986 | Tarczy-Hornoch et al. | 364/482 |
| 4,857,759 | 8/1989 | Murphy et al. | 364/483 |

Primary Examiner—Kevin J. Teska
Attorney, Agent, or Firm—Edward Langer; Peter L. Michaelson

[57] ABSTRACT

Programmable safety electrical socket controller apparatus for controlling operation of an electrical socket by distinguishing between an actual electrical load and a false load created by human contact, thereby substantially eliminating the risk of electrocution. The controller initially operates in a standby mode wherein the rated voltage of the electrical power system is effectively disconnected from the socket terminals. A data value group representing the electrical characteristics of the connected load is obtained at safe voltage levels and these are examined by a microprocessor, in which there is stored a set of electrical characteristics based on known physiological data relating to the human body. By comparison of the data value group with the stored characteristics, the microprocessor is able to determine whether any of the data value group parameters are inconsistent with those of an actual electrical load, before applying electrical system power in an energization mode, thus reducing hazards caused by accidental contact of a human being. After it has been determined that an actual load is connected and power has been applied, additional protection is provided in the energization mode against leakage current conditions, overload overvoltage, and overheating. Remote communication and monitoring functions are also provided.

46 Claims, 12 Drawing Sheets

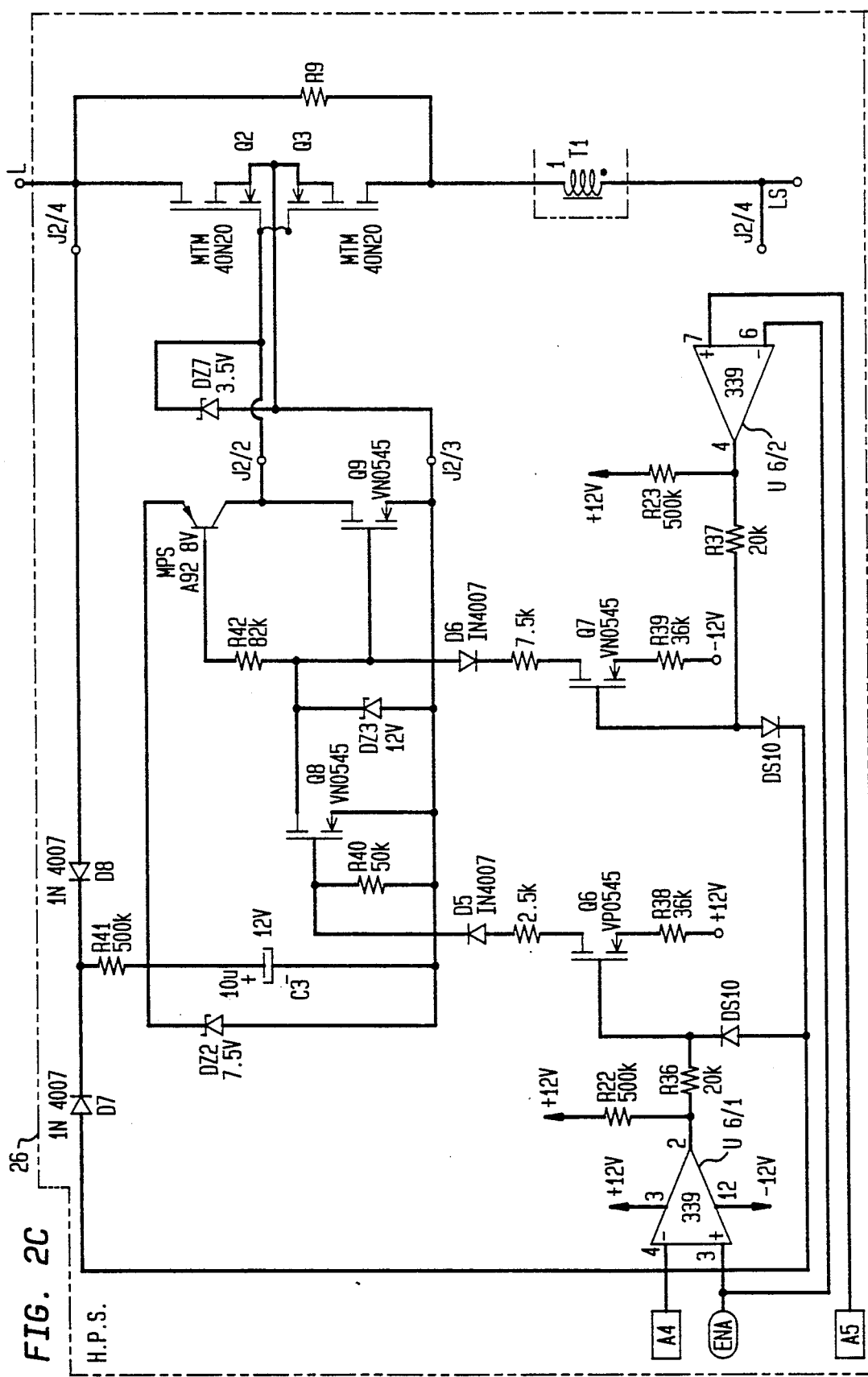
FIG. 2C H.P.S.

PROGRAMMABLE SAFETY ELECTRICAL SOCKET CONTROLLER

FIELD OF THE INVENTION

The present invention relates to electrical connectors, receptacles and sockets which provide protection against electrical shock, and more particularly, to a safety electrical socket which can be programmed via a controller to distinguish between possible electrocution hazards and normal operating loads before power is applied.

BACKGROUND OF THE INVENTION

The prior art of safety electrical socket and connector design includes many electrical wall outlets and light bulb sockets constructed for tamper-proof and shock-proof operation. A common feature of the prior art designs is the provision of a mechanical internal switch, generally operated upon insertion of an electrical plug or electrical load device, such as a light bulb, into the socket or receptacle. Operation of the mechanical switch completes the electrical connection of the electrical plug or load device with live contacts to which power is continuously applied. Examples of this design can be found in the following U.S. Patents:
U.S. Pat. No. 4,271,337 to Barkas;
U.S. Pat. No. 4,179,175 to Farnworth et al.;
U.S. Pat. No. 4,152,557 to Busch et al.;
U.S. Pat. No. 4,148,536 to Petropoulsos et al.;
U.S. Pat. No. 4,093,336 to Rose;
U.S. Pat. No. 3,915,536 to Glantz;
U.S. Pat. No. 3,895,195 to Morrison et al.;
U.S. Pat. No. 3,699,285 to Leatherman;
U.S. Pat. No. 3,596,019 to Koester;
U.S. Pat. No. 3,579,171 to Woodward; and
U.S. Pat. No. 2,735,906 to Avrunin.

Another design also intended for shock-proof operation is that disclosed by U.S. Pat. No. 4,647,120 to Karabakakis, in which an electrical safety plug carries a small magnet which magnetically activates an internal switch within a socket upon insertion. A variation of this design is disclosed in U.S. Pat. No. 4,616,285 to Sackett in which the magnetically operated switch is accessible from outside the socket.

In all of the above outlined prior art designs, the attempt to limit the risk of electrocution is based on mechanical barriers, actuators, etc. which attempt to prevent a person from touching live contacts. Because they are based on mechanical designs, they can only limit the risk of electrocution but do not eliminate it since they are subject to mechanical failure, corrosion, wear and tear, and the possibility of tampering to defeat their function. If mechanical or actuation failure is encountered in any of these designs, the results may be disastrous, since the electrical socket contacts are always energized by the power distribution system, and these may become accessible to human touch.

Another electrical safety device in widespread use on 220 volt-single phase residential power systems is a differential circuit breaker, designed to prevent the risk of electrocution. An example of this device is known as a "Schutzschalter" (also known as an earth leakage circuit breaker) which is manufactured and marketed by Siemens AG of Germany. This device contains a toroid, which is wound with a phase, neutral and pickup winding. The device operates on the principle of imbalance in the current between phase and neutral, which leads to induced electromagnetic flux in the toroid, and which can be detected by a pickup winding. The pickup winding is connected to a tiny solenoid which pulls a lever and triggers a mechanical arrangement for operating the breaker.

Since the phase and neutral windings usually do not produce exactly the same electromagnetic flux, there is always a small difference which is detected by the pickup winding, producing an induced voltage. To compensate for this problem while achieving maximum sensitivity, a small magnet is provided which can be calibrated by rotation so as to exert a counterforce on the trigger lever of the mechanical arrangement which operates the breaker. However, the calibration must be done at the factory and since it is a force-balance device, its calibration tolerance is critical.

Typically, the rated circuit breaker protection is for 30 mA leakage current. This leakage current trip rating is dangerous in the case of the human body, which will experience quite a shock at this level. If, however, the sensitivity is increased for response to smaller leakage current levels, the device will malfunction. This is because usually the device is installed to protect the entire household, and since it must serve many loads each of which has an inherent small leakage current, increasing its sensitivity may cause false tripping.

Another problem with the differential circuit breaker device is the design of the tripping mechanism, which requires mechanical amplification to permit the small solenoid to break high current contacts. The common approach is to use a "mechanical amplifier" which operates based on stored spring energy, and it has been reported that 30% of these devices do not function after one year in use.

Still another problem with this device is the speed of response. Because it is a mechanical design, the best expected response is in the tens of milliseconds range, and this exposes a person to an electrical shock, although it may not be fatal.

As outlined above, the differential circuit breaker device suffers from at least three inadequacies:
(a) it has limited sensitivity, and is dependent on a critical calibration setting;
(b) it operates on stored spring energy, and with the passage of time, friction, dirt, and ageing of mechanical parts, reliability is reduced; and
(c) it has a slow response since it depends on mechanical amplification which is accomplished in several stages which proceed in serial fashion.

Therefore, it would be desirable to provide a safety electrical socket which does not depend on the operation of mechanical parts, and therefore achieves a greater level of reliability and safety in assuring substantial elimination of electrocution risks.

SUMMARY OF THE INVENTION

Accordingly, it is a principal object of the present invention to overcome the above-mentioned disadvantages and provide a programmable safety electrical socket controller which is able to substantially reduce the risk of electrocution by distinguishing between a human being and an actual electrical load connected to the socket. The inventive socket controller operates in a pre-energization "standby mode", in which the rated electrical power is not applied to the load, and checks are made to distinguish between "false" and actual electrical loads. Upon successful completion of these checks and a determination that an actual electrical load is connected, the inventive socket controller automatically switches to an "energization" mode, during which electrical power is applied to the load.

Another object of the invention is to provide leakage current protection by testing both actual electrical loads and false loads for leakage conditions in the pre-energization "standby" mode.

Another object of the invention is to provide, in the pre-energization standby mode, a determination of the existence of overload conditions so as to prevent application of power to the safety electrical socket.

Still another object of the invention is to provide, after the socket has been energized, short-circuit, overload interruption and leakage current protection, by de-energizing the safety electrical socket upon the occurrence of these conditions.

Still a further object of the invention is to provide a self-monitoring feature during operation of the safety electrical socket, which guards against overheating conditions.

Still another object of the present invention is to provide computer data and/or power line communications to the programmable safety electrical socket controller for enabling and disabling socket operation.

Yet another object of the present invention is to protect sensitive electrical appliances from hazards caused by surge voltage conditions, transients, etc. by de-energizing the socket within a minimum safe interval of approximately 10 microseconds.

Still another object of the invention is to provide switching on of the socket at time instants corresponding to zero voltage crossings and switching off of the socket at zero current crossings, to avoid sparking of inductive loads.

In accordance with a preferred embodiment of the present invention, there is provided programmable safety electrical socket controller apparatus comprising:

load connecting apparatus;

apparatus connected to the load connecting apparatus for measuring, in a standby mode, a set of electrical characteristics associated with a connected load;

apparatus for converting the set of electrical characteristics to a group of data values;

processor apparatus for receiving and examining the data value group and determining a switching signal corresponding to an energization mode; and power switching apparatus responsive to the switching signal for applying electrical power to the load connecting means for use by the load in said energization mode, the processor apparatus being programmable so as to determine the switching signal for controlling a transition of the power switching apparatus between the standby and energization modes, dependent upon examination of the data value group for the absence of characteristics inconsistent with those of an actual electrical load.

In the preferred embodiment, the programmable safety electrical socket controller apparatus is provided as a microprocessor-based design enclosed in a socket housing, which initially operates in a standby mode wherein the rated voltage of the electrical power system is effectively disconnected from the socket.

In this mode, the socket is not a source of power, acting rather as a measuring device for determining whether a hazardous condition exists before applying electrical system power in an energization mode. The measuring device function is carried out by the microprocessor and auxiliary hardware, which determines, at safe voltage levels, whether an actual electrical load is connected, or whether a false load is presented to the safety electrical socket by accidental contact of a human being. Based on its ability to distinguish between an actual electrical load and a false load created by human contact, the inventive socket substantially eliminates the risk of electrocution.

When contact is made with the socket connectors by any load, this is detected and a test is made at low voltage conditions whether there is any leakage to ground. If no leakage is detected, the load impedance is measured and an overload prediction function is provided by examination of the electrical characteristics and calculation of the expected load current for operation of the safety electrical socket at rated voltage in the energization mode. If it is determined that an overload condition will be obtained, transition of socket operation from the standby mode to the energization mode does not occur.

If there is no leakage current and no expected overload, microprocessor operation then proceeds by examination of a data value group representing the electrical characteristics of the connected load, as gathered during the standby mode. Stored in the memory associated with microprocessor operation, is a set of electrical characteristics based on known physiological data relating to the human body. By comparison of the data value group with the known electrical characteristics of the human body, the microprocessor is able to determine whether any of the data value group parameters are inconsistent with those of an actual electrical load, more closely resembling those associated with the human body.

If all of the tests have been passed successfully and a determination is made that an actual electrical load is connected, the microprocessor signals a solid-state power switch which causes a transition from the standby mode to an energization mode within which electrical system power is applied to the load connectors of the safety electrical socket. Otherwise, the standby mode is maintained.

Another feature of the inventive safety electrical socket controller is its ability to monitor continued operation once electrical system power has been applied. If a leakage or overload condition occurs for any reason, an interruption function is provided via the solid-state power switch. Included in the monitoring function is the provision of thermal monitoring of socket operation, to detect conditions of overheating.

Still another feature of the invention is the ability to guard against hazardous conditions associated with external factors such as building defects which cause water to enter an electrical socket. In prior art electrical socket designs, a hazard exists if water comes into contact with the socket, since even the insulated portion of the socket housing is practically connected to the line voltage, and contact with its surface may cause electrocution. By virtue of its testing function, the inventive socket controller prevents application of line voltage to the socket until after successful load testing.

Yet another feature of the invention is the provision of computer data and/or power line communication capability, by which the microprocessor can be controlled from remote locations, for purposes of enabling or disabling socket operation.

Because of its microprocessor-based design, the inventive safety electrical socket controller can be constructed as a compact add-on unit for enclosure within existing wall outlets. Alternatively, it may be provided as an integral part of an original socket construction.

Other features and advantages of the invention will become apparent from the drawings and the description contained hereinbelow.

BRIEF DESCRIPTION OF THE DRAWINGS

For a better understanding of the invention with regard to the embodiments thereof, reference is made to the accompanying drawings in which like numerals designate corresponding elements or sections throughout, and in which:

FIG. 2 shows the proper alignment of the drawing sheets for FIGS. 2A-2D;

FIGS. 2A-D and 3A-B are respectively, electrical circuit schematics of the safety electrical socket controller illustrated in the electronic block diagram of FIG. 1;

DETAILED DESCRIPTION OF THE PREFERRED EMBODIMENT

Figure 1:
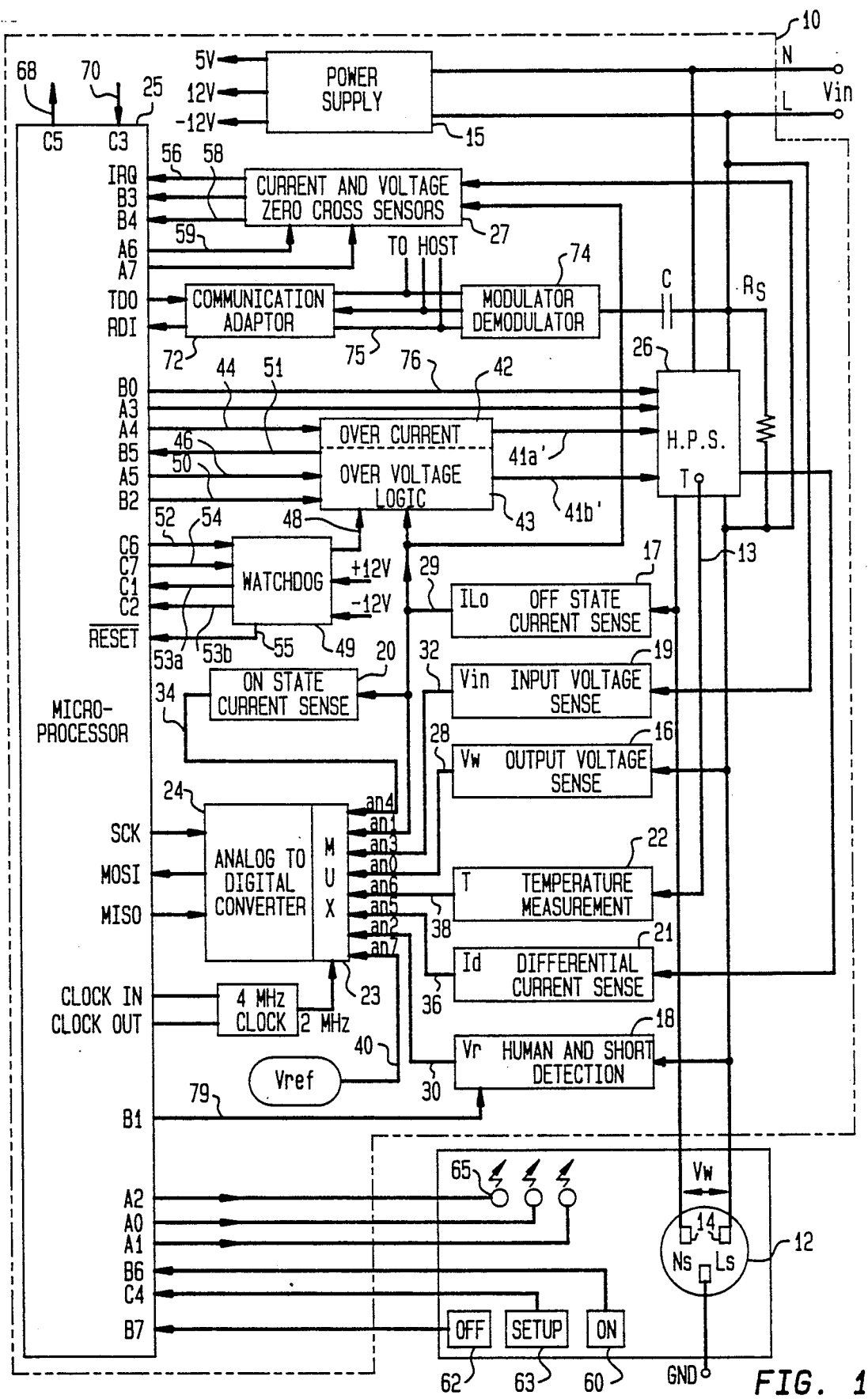
FIG. 1 is an electronic block diagram showing a preferred embodiment of a microprocessor-based programmable safety electrical socket controller constructed and operated in accordance with the principles of the present invention.
Figure 2A:
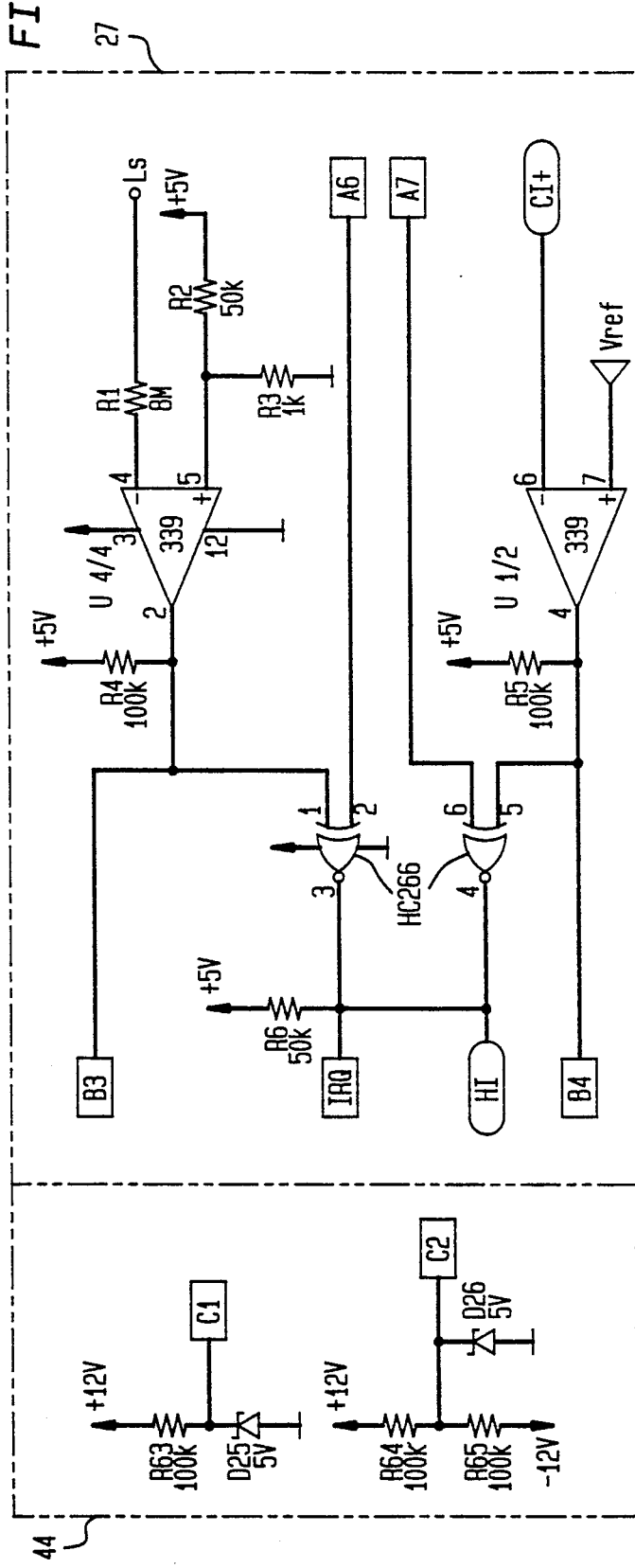
Figure 2A:
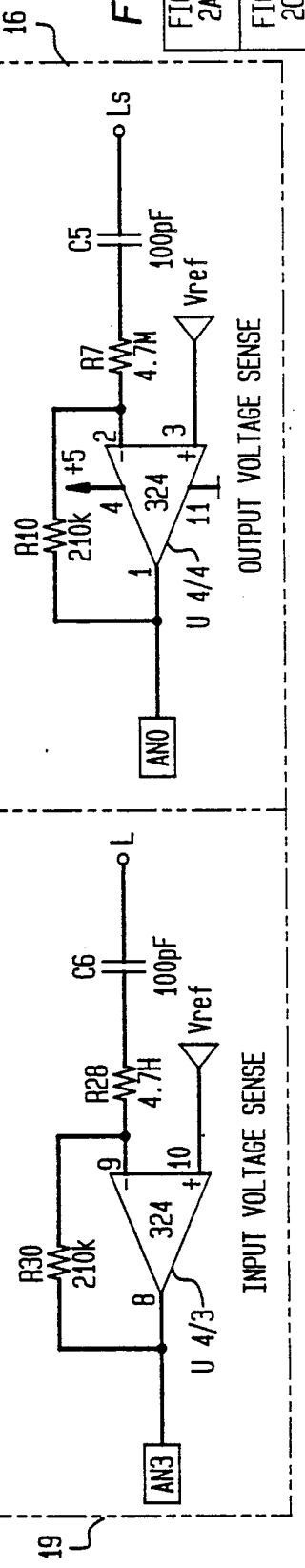
Figure 2B:
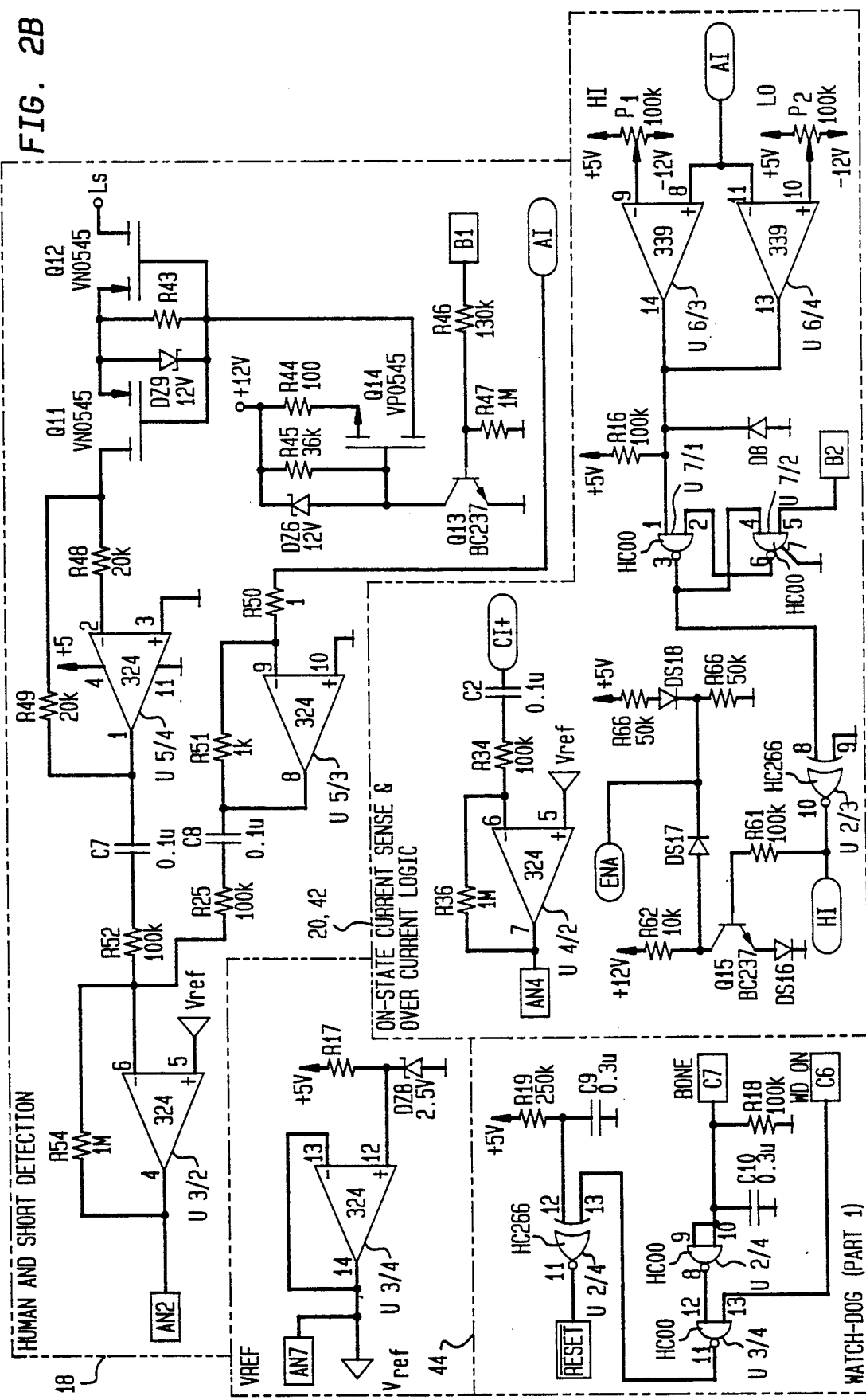
Figure 2D:
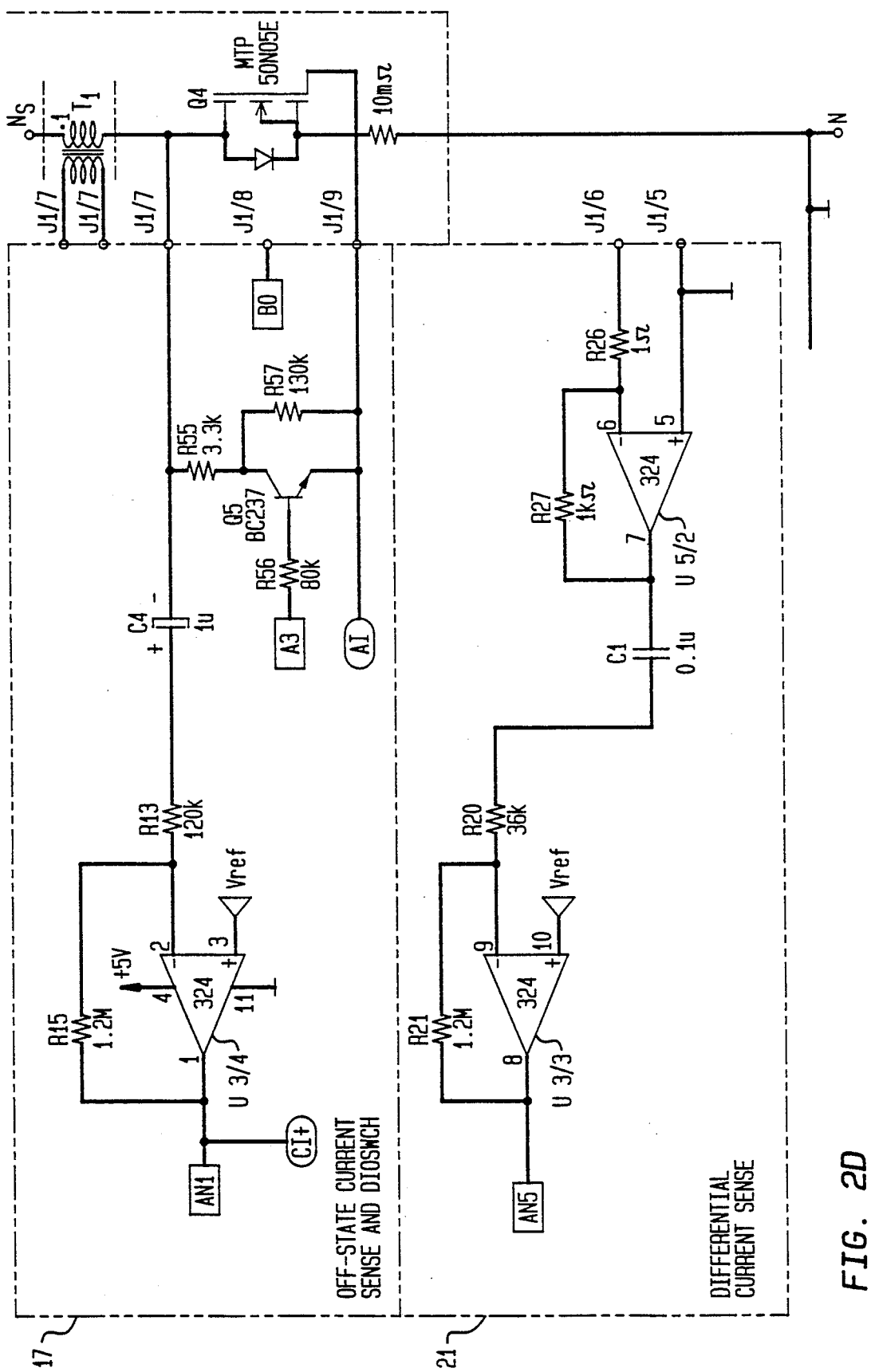
Figure 3A:
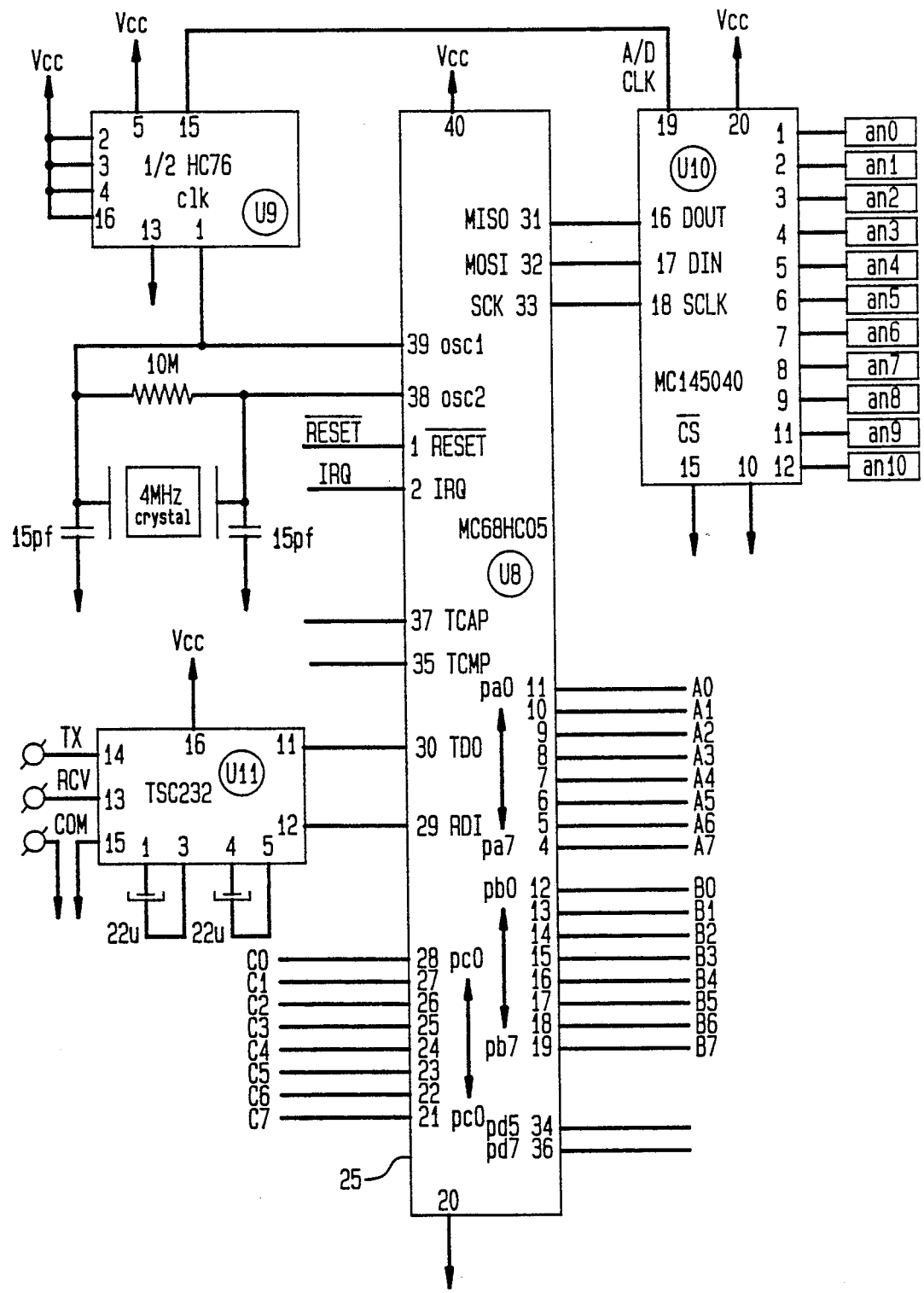
Figure 3B:
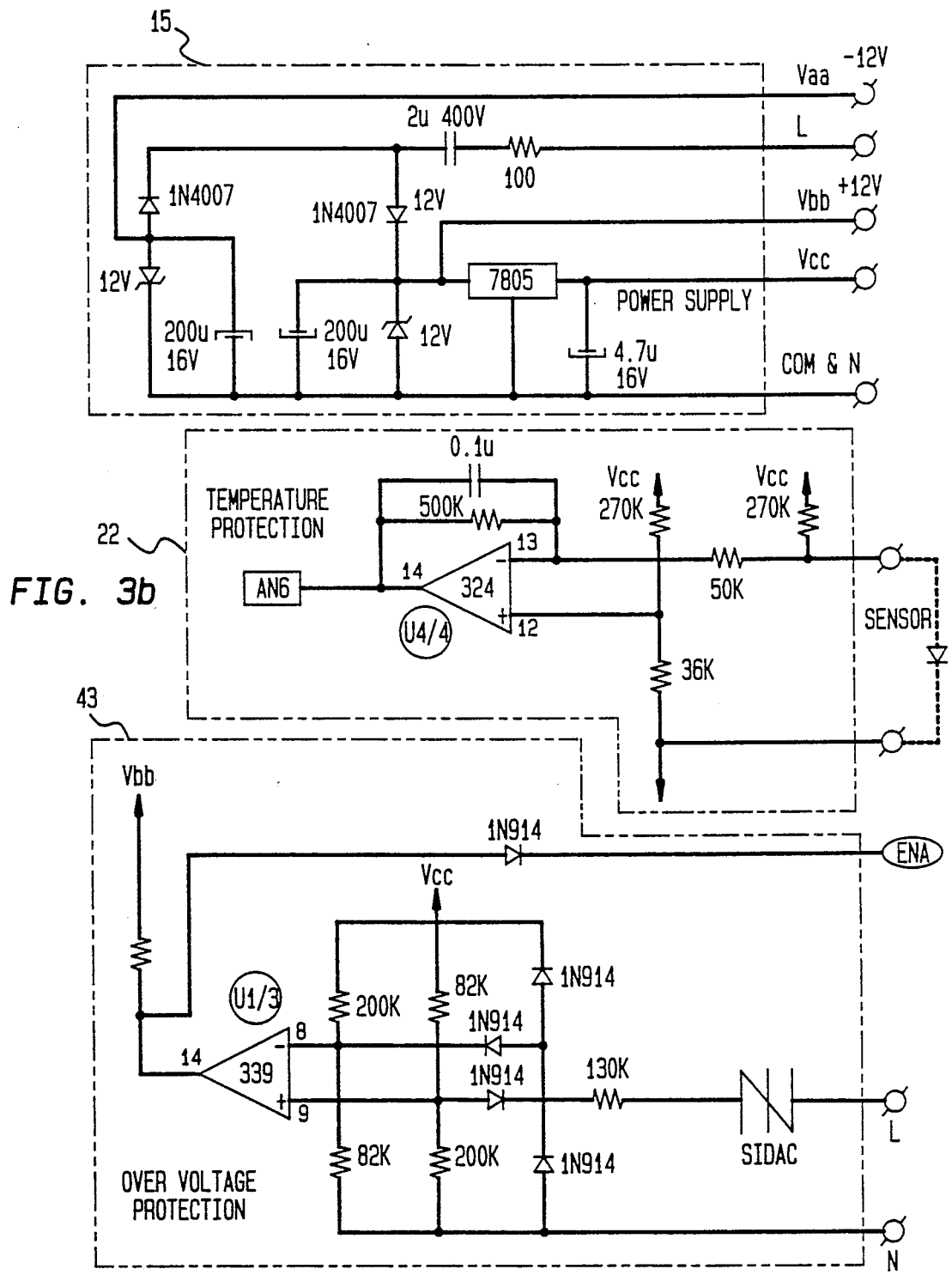

Referring now to FIG. 1, there is shown an electronic block diagram of a preferred embodiment of a microprocessor-based safety electrical socket controller 10 constructed and operated in accordance with the principles of the present invention. Controller 10 is typically designed for use with an electrical socket 12, and is connected between an electrical power system providing a voltage input (Vin), and the electrical connectors 14 providing line (Ls) and neutral (Ns) of socket 12. Controller 10 applies an output voltage (Vw) to electrical connectors 14, and this voltage output is dependent upon its operation in one of two modes: (1) a standby mode and (2) an energization mode. As described further herein, the operation of controller 10 is based on its ability to distinguish between "false" loads which are connected to socket 12, and an actual electrical load. As used in the following description, a "false" load is intended to include a dangerous condition in which a human being is in contact with socket 12 connectors 14.

Controller 10 comprises a combination of electronic hardware blocks which facilitate its operation in each of the standby and energization modes. These include a power supply 15, analog amplifier measuring devices 16-22, multiplexer 23, A/D converter 24, microprocessor 25, power switch 26 and a set of current and voltage zero cross detectors 27. Current measurement device 21 measures differential current (Id) generated by its pickup coil in the event of leakage current conditions. Differential current (Id) is equivalent to the difference between phase (L) and neutral (N) currents in a single phase supply arrangement. The electrical power system voltage input is denoted by Vin, and the load current is denoted by IL.

Typically, current measurement device 21 comprises a current transformer which is provided as a toroid-shaped ferrite core having three windings. One of the windings is in series with the phase line, and another is in series with the neutral. These carry full load current IL and since they are wound in opposite sense on the ferrite core, the net flux is zero, such that a third (pickup) winding has zero induced voltage.

As long as there is no leakage path, there is no induced voltage on the pickup winding. If however, a person touches the phase line, a leakage path is created and the input current is not equal to the output current, causing an induced voltage on the pickup winding, which is detected as Id (leakage) current. Once measured, the values of current Id and IL are amplified and sent to multiplexer 23. Multiplexer 23 feeds A/D converter 24, which supplies data to microprocessor 25, which may be implemented as a device in the Motorola 6805 family.

Power switch 26 (HPS) is connected such that the voltage input (Vin) is applied to it, and at its output, it applies an output voltage (Vw) to electrical connectors 14 of socket 12. One leg of power switch 26 is shunted by a resistor Rs which acts as a current bleeder when power switch 26 is in an "OFF" state. A thermal monitoring signal 13 (T) represents the temperature of the external surface of power switch 26, which is provided to multiplexer 23.

Multiplexer 23 is repeatedly addressed by microprocessor 25 to select one of eight analog signals 28-40 fed to its respective inputs an0-an7, which are provided by respective analog amplifiers 16-22. Each of signals 28-40 provides a respective one of parameters Vw, ILo, Vr, Vin, IL, Id, T and Vref which are converted in A/D converter 24 and sent to microprocessor 25. Power switch 26 is typically constructed of two power TMOS transistors which operate in "ON" and "OFF" states in response to gate signals 41a-b coming from overcurrent and overvoltage logic circuits 42-43. Typical devices for power switch 26 include IRF 250 manufactured by International Rectifier and MTM40N20 manufactured by Motorola, or equivalent.

Logic circuits 42-43 are implemented by hardware and are operated independent of microprocessor 25 software, and are fed by four logical signals which determine its operation: "power switch ON" signals 44, 46 from microprocessor 25, an enable signal 48 from watchdog monitoring hardware 49, and a flip-flop reset signal 50. Logic circuits 42-43 operate to trip power switch 26 in an overload condition, which is reported to microprocessor 25 by overload signal 51. Flip-flop reset signal 50 is provided to reset logic circuits 42-43 upon a determination by microprocessor 25 that normal conditions have been restored after removal of the overload condition.

Watchdog monitoring hardware 49 is turned on by a control signal 52 from microprocessor 25 after an initialization procedure as described further herein. One of its functions is to monitor the supply voltages from power supply 15, and it sends back to microprocessor 25 a pair of "power supply OK" signals 53a-b, one for each of +/−12 Vdc supply.

Anotehr function of watchdog monitoring hardware 49 is to periodically check the operation of microprocessor 25 by receiving a periodic trigger signal 54 from it. Should this signal be absent for a period greater than a predetermined interval, the microprocessor operation is halted via flip-flop reset signal 55, setting enable signal 48 so as to cause logic circuit 42 gate signals 41a-b to turn off power switch 26.

The overcurrent logic circuit 42 operates in relation to a maximum reference current Imax, which is set to the maximum rated surge current of the socket 12. This reference is compared against the load current IL, and if the reference is exceeded, logic circuit 42 initiates gate signals 41a-b to turn off power switch 26. In overvoltage logic circuit 43, an overvoltage protection function is provided by a variable dependent resistor (VDR) or, if preferred, a SIDAC bilateral high voltage trigger which triggers a comparator that will momentarily shut off power switch 26 via gate signals 41a-b. This complements the function of a transient suppressor which can be connected across the line (L) and neutral (N) terminals of controller 10.

The set of detectors 27 comprises two detectors, a zero cross detector for output voltage Vw and a zero cross detector for load current IL. These detectors provide needed time-base data via interrupt request line 56. The time-base data includes the phase shift between voltage and current, which is obtained by direct measurement. Signals 58 and 59 identify which of the two detectors initiated the interrupt.

As will be described further herein, microprocessor 25 normally operates in the standby mode. When a load is first connected at load connectors 14, microprocessor 25 initiates testing to acquire a data value group forming the basis for decision-making with regard to the type of load which is connected. Based on its decision, microprocessor 25 controls the transition of power switch 26 between respective standby and energization modes from an "OFF" state to an "ON" state.

The output voltage Vw at the output terminals of power switch 26 is monitored by analog amplifier 16. Before a load is connected to socket 12, there is no current flowing in resistor Rs, typically 2M ohm. Thus, the input voltage Vin appears at the output of power switch 26, as a "floating" voltage. When any kind of load is connected to socket 12, this "floating" output voltage drops immmediately, and by its monitoring function, analog amplifier 16 provides a wakeup function via the immediate drop in output voltage Vw to microprocessor 25.

The immediate drop in output voltage Vw initiates the start of the measurement portion of the standby mode, during which microprocessor 25 analyzes the load which is connected to socket 12. For purposes of this analysis, microprocessor 25 determines whether leakage current conditions exist, the load is a shorted load, a load which exceeds the overcurrent rating, or a human being. In each of these cases, as described in the flowcharts to follow (FIGS. 7 and 8A-8B), socket 12 will not enter its energization mode since power switch 26 is not switched into the "ON" state by gate signals 41a-b.

A set of manual touch controls is provided to enable external control over the controller 10 functions, permitting on button 60 and off button 62 to control socket 12 operation without removing the load connected to it. An optional setup button 63 enables special features to be programmed via pre-designated codes which effect program selection and execution in microprocessor 25. A set of LEDs 65 are used to indicate the "ON" and "OFF" states, and to prompt the entry of control codes.

A pair of inhibit signals 68 and 70 are directly provided to microprocessor 25, enabling external control of socket 12. In an arrangement where a plurality of sockets 12 is provided, one of them may be a master and its inhibit signal 68, 70 may be provided to instruct the operation of remaining sockets 12.

Also shown in FIG. 1, an RS-232C communications link 72 is provided for direct communication with a PC host for programmed time-dependent control of socket 12. In addition, power line communications can be achieved through a capacitively-coupled modulator/demodulator 74. This arrangement allows instructions to be received and sent over the power line, using a frequency-based protocol such as the FSK system. Using the FSK communications protocol, an electric power company is able to enable or disable electric socket 12 operation from a remote center, facilitating resolution of consumer billing disputes.

Referring now to FIGS. 2A-2D and 3A-3 there are shown electrical circuit schematics of the preferred embodiment of the safety electrical socket controller 10 illustrated in the electronic block diagram of FIG. 1. Typical component values are shown, allowing for implementation of these circuits based on skill of the art electronic design techniques. Using labels of the I/O signals of microprocessor 25 and multiplexer 23 shown in FIG. 1, cross-reference to these circuit schematics is possible, as will be understood by those skilled in the art. For example, analog amplifier 19 (Vin) of FIG. 1 which generates signal 32 (labeled an3) can be found on FIGS. 2A-2D as an output of op amp U4/3 (also labeled an3). In another example, the same approach can be used to trace signal 54 (I/O signal C7) to gate input U7/3 via diode DS19.

Figure 4:
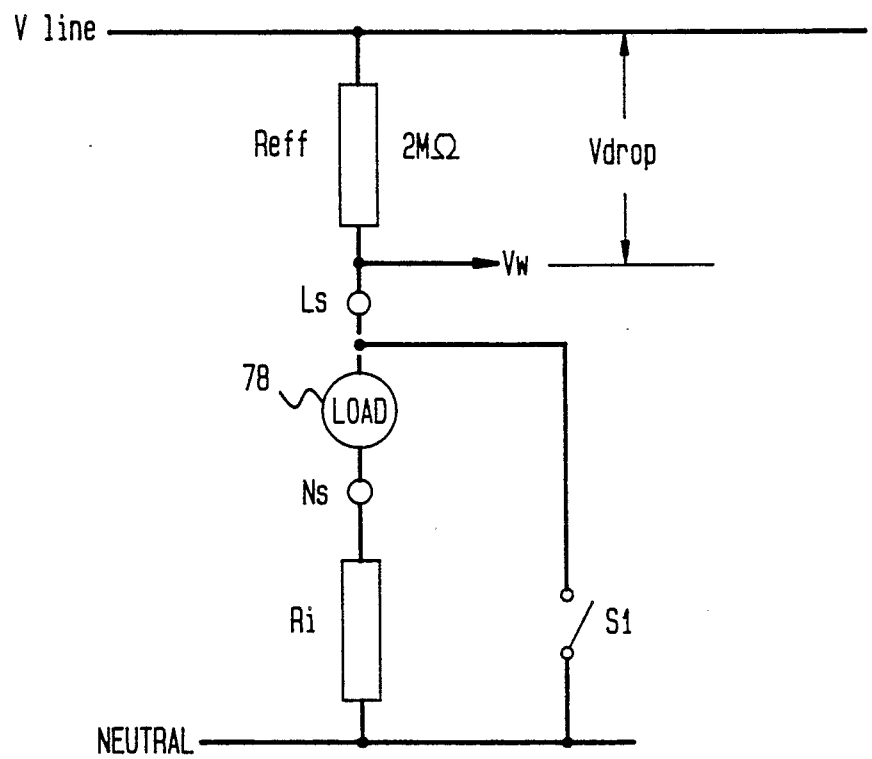
FIG. 4 is a schematic diagram of a test circuit useful in determining physiological characteristics of a human being, by an excitation pulse response measurement technique.

Referring now to FIG. 4, there is shown a schematic diagram of a test circuit useful in determining physiological characteristics of the human body, for purposes of distinguishing these characteristics from those of an actual electrical load. The impedance Reff represents an effective resistance presented by the shunt resistor Rs in parallel with the leakage resistance of the power switch 26. This is shown in the schematic of FIG. 2 as power transistors Q2 and Q3. Impedance Ri, formed through transistors Q4 and Q5, is provided to measure the current flowing in the neutral side (Ns) of socket 12, during "OFF" state operation of power switch 26. When power switch 26 undergoes transition to the energization mode, impedance Ri is set from a maximum to a minimum value approaching zero by the control signals 75 and 76 from microprocessor 25, which force transistors Q4 and Q5 into conduction.

As shown in FIG. 4, a load 78 is connected in series with Reff and Ri, and represents either a false load or an actual electrical load, which is to be examined for purposes of determining whether to apply electrical power as part of the safety electrical socket 12 function. A test switch S1 is provided to discharge stored energy in load 78 at predetermined instants during the sequence of testing, for measuring the residual voltage after a given interval. The residual voltage (Vw in this test) is the voltage remaining on the load after an excitation pulse has been applied, and a discharge interval has elapsed.

The test switch S1 is implemented in the schematic of FIGS. 2A-2D by transistors Q11-Q12 and operational amplifier U5/1, and operates in response to a control signal 79. When control signal 79 turns on Q11 and Q12 transistors, a dynamic virtual zero is forced at the line side of electrical connectors 14 (Ls). This enables measurement of the residual voltage without disturbance from the leakage current of Reff at this instant.

Figure 5:
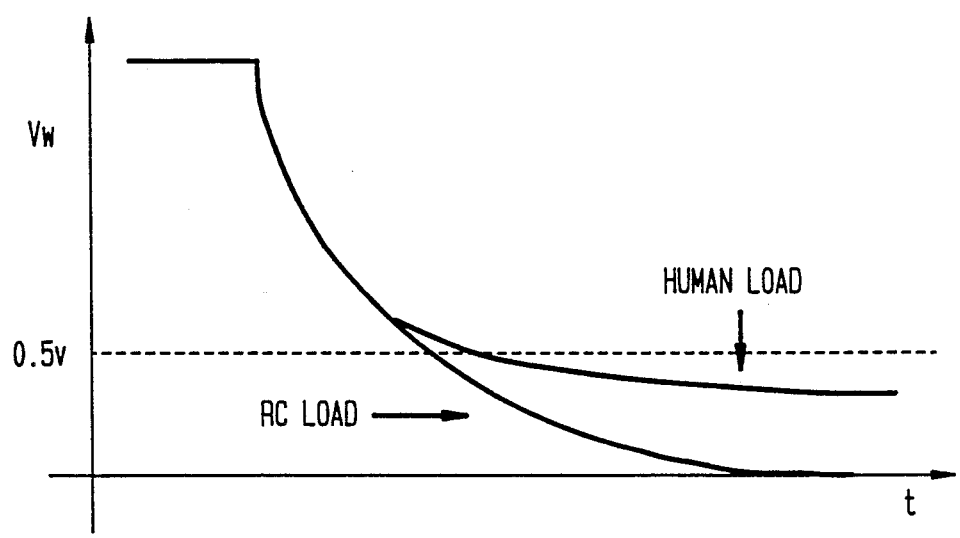
FIG. 5 is a characteristic curve of a residual voltage related to a physiological characteristic obtained in response to a square wave excitation pulse.

As shown in FIG. 5, in the case of an actual electrical load having a capacitive impedance (RC load), discharge of an applied voltage occurs over a discharge interval until it approaches zero. In contrast, if a false load (human being) is being examined in the test circuit of FIG. 4, at the end of the discharge interval, a voltage is present which is the residual voltage characterizing the human being. This effect reflects a non-linear behavior unique to the human body and can be measured within the range of a few hundred millivolts, due to the electrolytic nature of human body tissue.

Figure 6A:
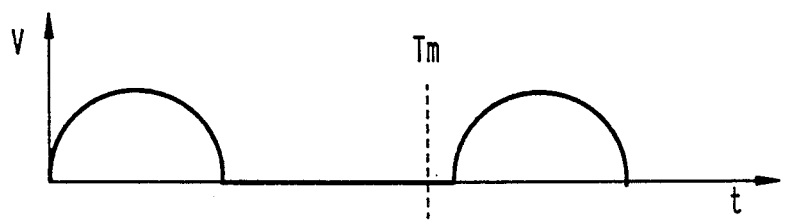
FIGS. 6A-6D are a set of waveforms obtained from application of the technique of FIGS. 4-5 to a load connected to the safety electrical socket of FIG. 1, where a half sine wave is used as the excitation pulse.
Figure 6B:
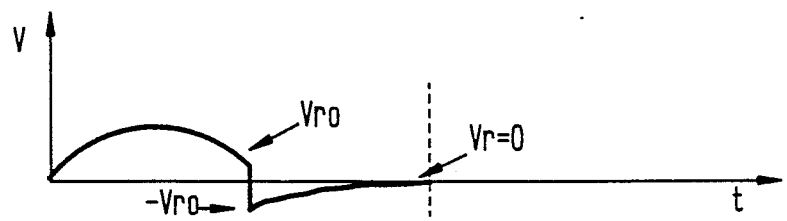
Figure 6C:
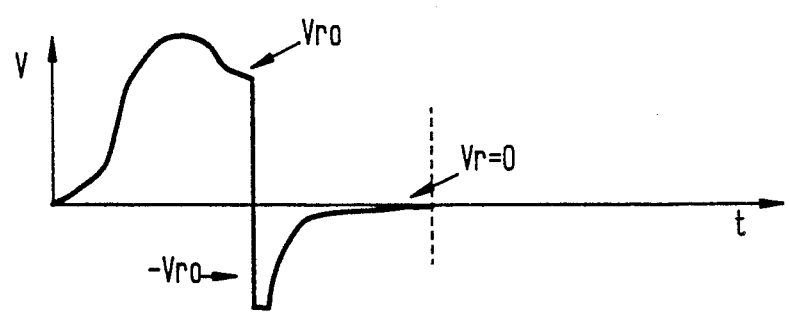

Referring now to FIGS. 6A-6D, there is shown a set of waveforms obtained from application of the technique of FIGS. 4-5 to a load connected to the safety electrical socket 12 of FIG. 1, where a voltage half sine wave is used as the excitation pulse (FIG. 6A). This voltage is derived from the system voltage reduced by the voltage drop across Reff, so that this test is performed at a safe voltage level. FIG. 6B is the residual voltage (Vr) measured at time Tm, close to but prior to the next excitation pulse, for the case where load 78 is a low impedance, high capacitance load. FIG. 6C is the same measurement for a high impedance, low capacitance load. These two waveforms (FIGS. 6B-6C) represent substantially the whole range of load characteristics for loads having some capacitance. As shown, the residual voltage (Vr) is virtually zero.

Figure 6D:
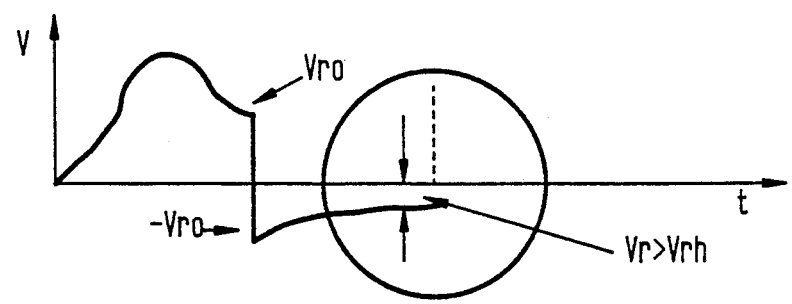

FIG. 6D shows a waveform for a human load, where the residual voltage (Vr) at time Tm is not zero, but has a typical value of a few hundred millivolts. This characteristic forms the basis for microprocessor 25 decision-making in an attempt to distinguish false and actual electrical loads. The parameter Vro is used to select the proper scale for measurement of the impedance and the phase shift between load voltage and current as will be described further herein with respect to the flowchart of FIG. 8B.

In operation, when no load is connected to socket 12, power switch 26 is in the "OFF" state. When power to safety electrical socket controller 10 is applied for the first time, an initial procedure is carried out. The first step in this procedure involves comparison of the contents of a location in the RAM memory of microprocessor 25 with a corresponding ROM memory location to determine whether the initial procedure has been carried out previously, which is true only if both values are equal, i.e., there has not been an electrical system power failure.

As part of this first test, microprocessor 25 determines whether input voltage Vin is arranged for a 220 volt, 50 cycle power system or a 115 volt, 60 Hz system. This is accomplished by reading the input voltage (Vin), and measuring the time interval between successive zero crossings of the voltage signal.

The next test is to measure inherent parameters of socket 12, namely, the impedance, leakage current, capacitance and inductance, which constitute a data base (no-load "fingerprint") for use in adjusting the measured values of the load parameters to extract their actual values. Certain other constants are programmed in the ROM, such that for measured values below these, socket 12 is declared faulty and cannot be energized, regardless of the load connected to it. In addition, the LED set 65 will flash as an announcement.

The last test in the initial procedure is to operate an internal dummy load by combination of signals 75, 76 and 79 to simulate a load which microprocessor 25 examines. The parameters of the internal dummy load are known and burned in the microprocessor 25 ROM. If the measurements associated with the internal dummy load match the contents of the ROM, controller 10 enters its standby mode, otherwise it is considered faulty and its operation is shut down.

In accordance with the principles of the present invention, the main objective of socket controller 10 is to apply power only to actual electrical loads and thereby substantially eliminate the risk of electrocution. For this purpose, microprocessor 25 is programmed in accordance with skill of the art software techniques to execute a software algorithm based on the following flowcharts.

Figure 7:
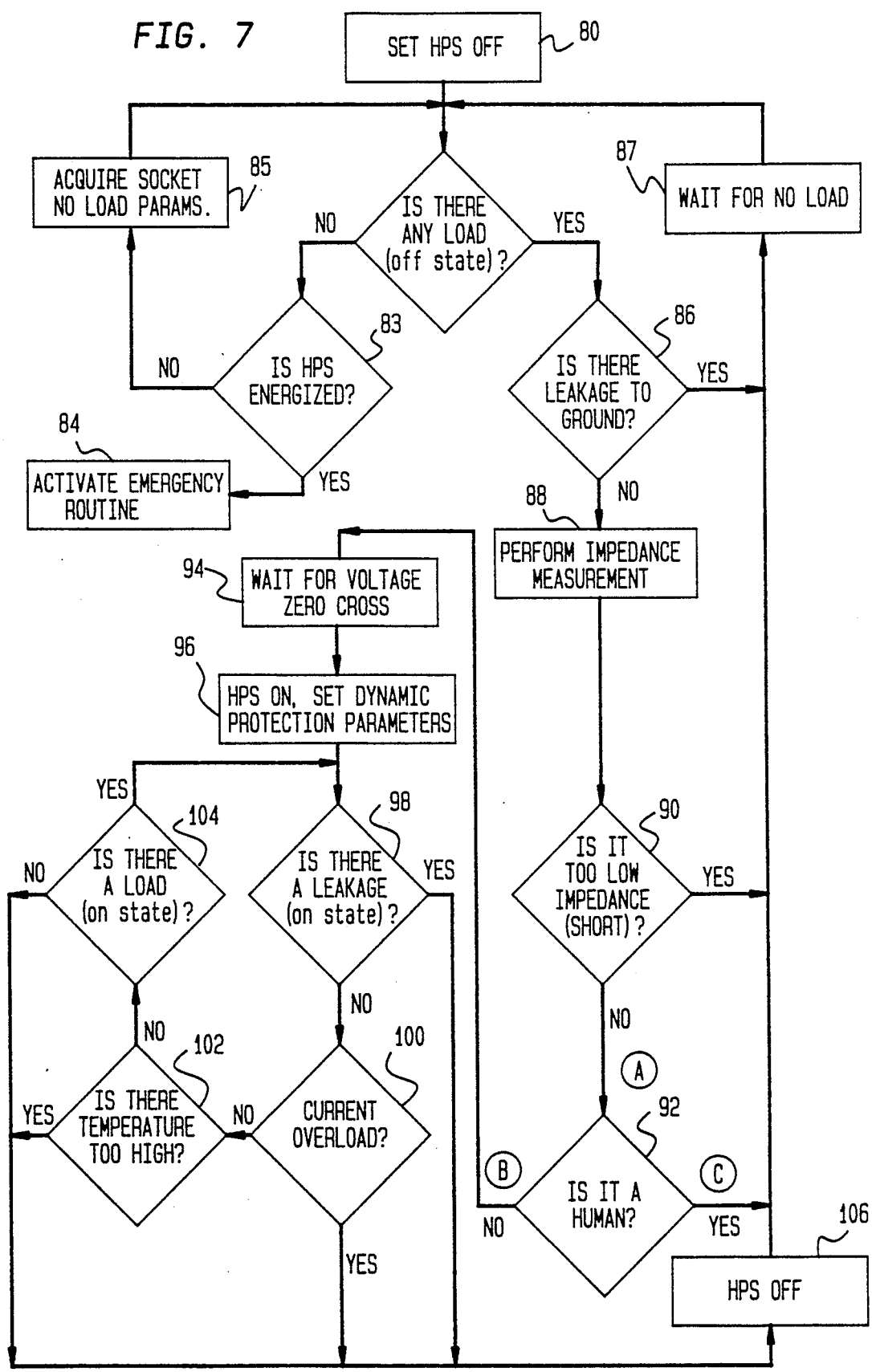
FIG. 7 is a flow chart diagram of the operation of the microprocessor shown in the electrical block diagram of FIG. 1.

Referring now to FIG. 7, there is shown a flowchart of the operation of safety electrical socket controller 10. Initially, in block 80 of the standby mode, the power switch 26 is in the "OFF" state and no load is connected at socket 12. In an initialization procedure before a load is connected, block 82 detects a no-load condition and the power switch 26 is checked for an initially de-energized state in block 83. If for some reason the power switch is activated without a load being connected, block 84 activates an emergency routine. If power switch is de-energized as in the normal case, block 85 acquires the no-load "fingerprint" parameters of socket 12.

The emergency routine deals with abnormal conditions by attempting to turn power switch 26 "OFF". If this is not successful, LEDs 65 will flash to announce the malfunction. In the preferred embodiment, a normally closed reed relay contact (not shown) is installed in series with the power switch 26, which can be locked open by microprocessor 25, making socket 12 inoperative in a safe condition. Since this relay is used only as a backup protector and does not commutate power, it does not require much physical space and can be fit into the socket 12 housing.

When contact is made with electrical connectors 14 by any load, this is detected in block 82 by an immediate drop ($Vdrop = Vline - Vw$) in the "floating" voltage output Vw. Operation proceeds in block 86 where a test is made at low voltage conditions whether there is any leakage to ground. This is accomplished by setting the value of Ri to its maximum impedance to enable the measurement of small currents. Since Reff is known, the current (Vdrop/Reff) is compared to the direct measurement of the current on Ri, and if they are equal, there is no leakage. If not, system operation branches to block 87, where it waits until the load is disconnected, and the no-load "fingerprint" is restored, before completing the loop in block 80.

Under conditions of no leakage, operation proceeds in block 88 where the impedance of the load is measured using standard steady-state techniques involving calculation of real and imaginary values of the load parameters as well its phase shift. Since the phase shift (Φ) is known from the zero cross detector 27 measurements, and the absolute value of the impedance $Z=Vw/IL$, the real and imaginary portions of the impedance can be calculated in microprocessor 25, using $Z\cos \Phi$ for the real and $Z \sin \phi$ for the imaginary part.

The range of impedance measurement is wide, and therefore it is divided into two scales of measurement gain sensitivity, which are selected according to the amplitude of Vro (FIG. 6). In block 90, an overload prediction function is carried out wherein measured impedance is compared with the maximum permissible rating of socket 12 to insure that no overload conditions exist, in the event that switch 26 will be turned "ON". If such a condition exists, operation returns to block 87 and waits for a no-load condition.

Figure 8A:
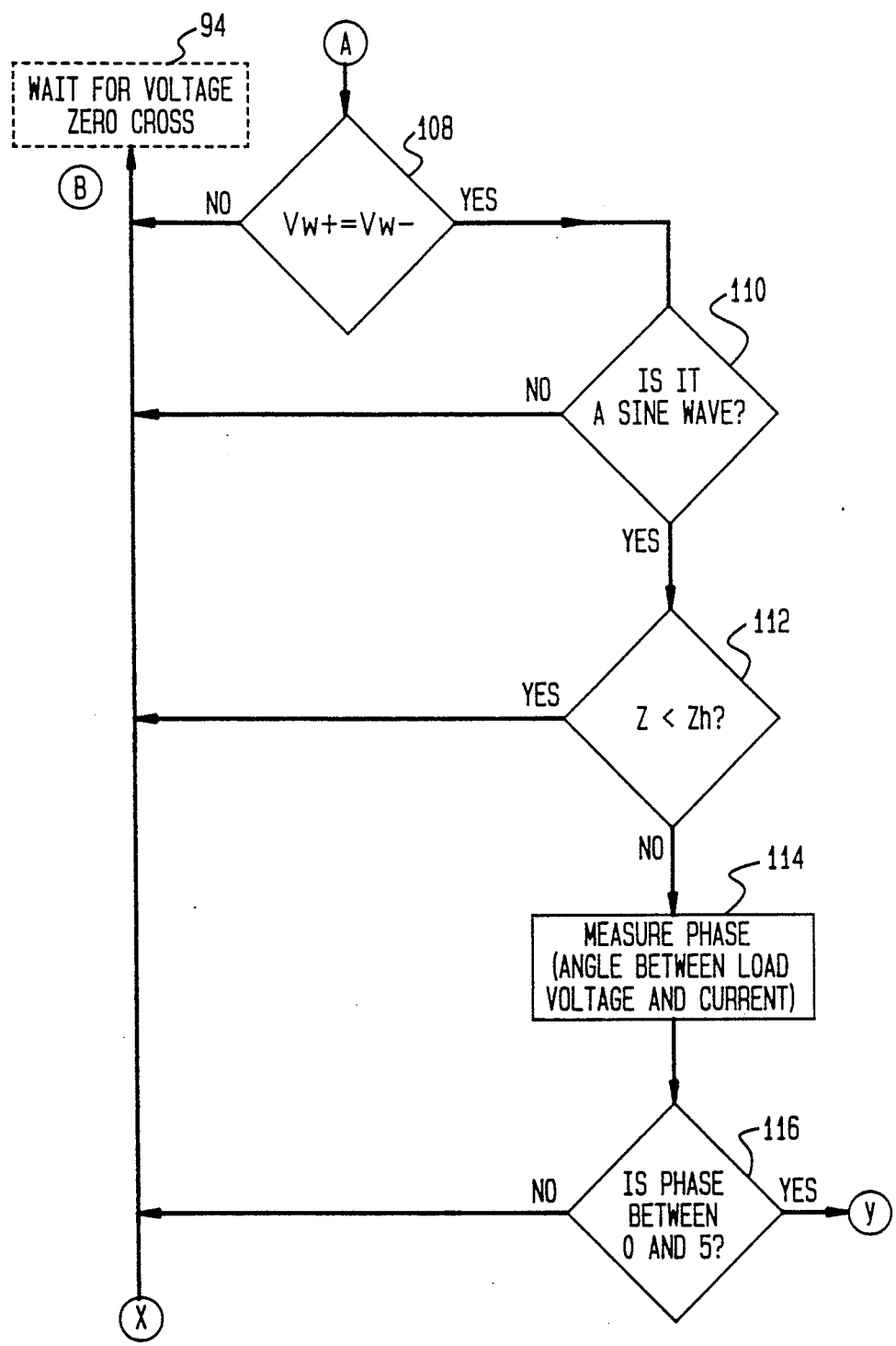
FIGS. 8A-8B are flow chart diagrams of a false load detection operation performed in a portion of the flow chart of FIG. 7.
Figure 8B:
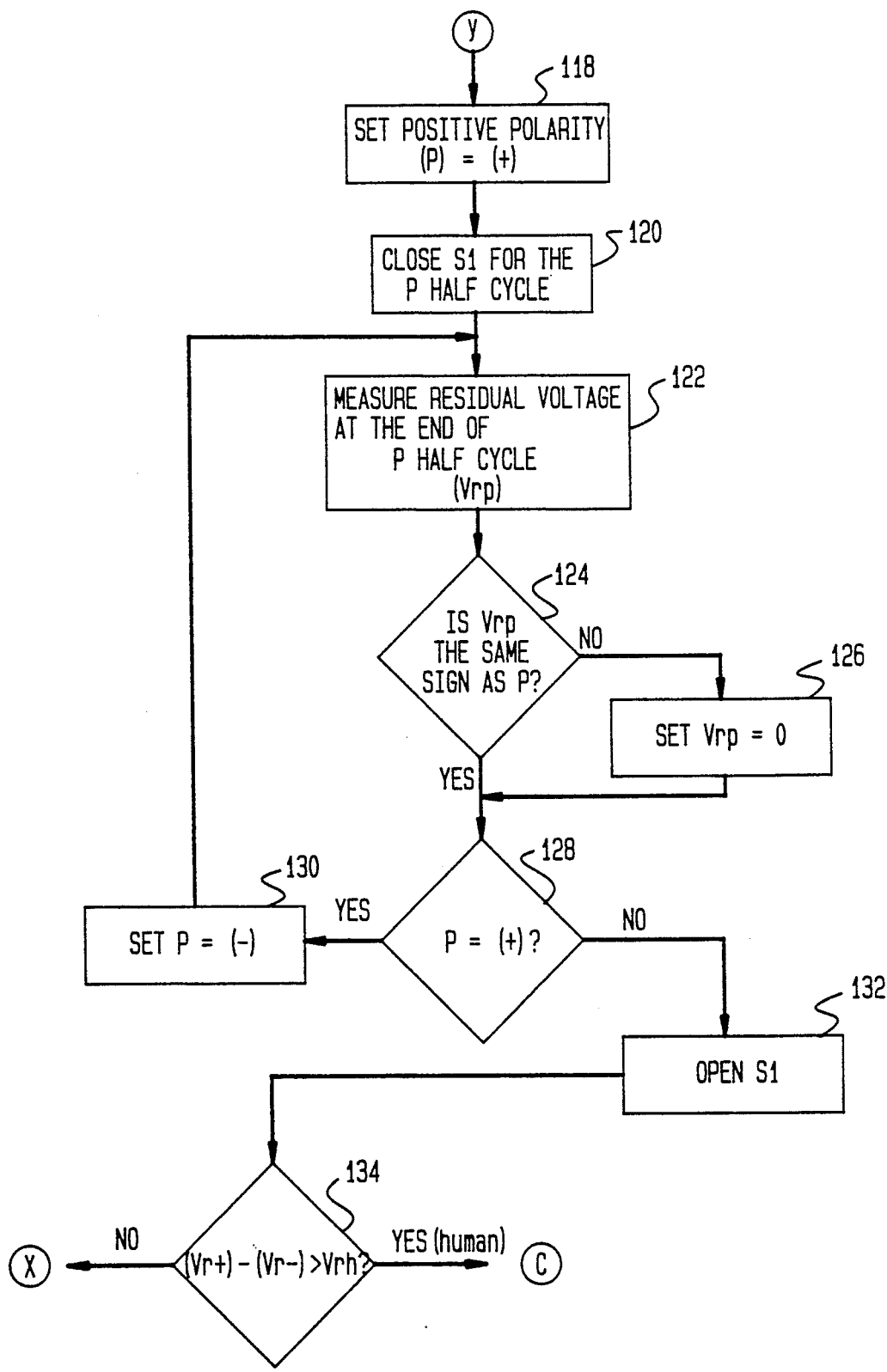

As described in greater detail in FIGS. 8A–8B, if the measured impedance is acceptable, block 92 performs a false load detection operation to check the possibility that a false load is connected, as in the case of a human being. If a false load is detected in this step, operation returns to block 87 and waits for a no-load condition.

If and only if all of the tests performed in the standby mode indicate that an actual load is connected to socket 12, microprocessor 25 proceeds to carry out the next step in block 94, where a voltage zero crossing is detected for purposes of initiating transition of power switch 26 from the standby mode to the energization mode. When power is applied to socket 12, the values of load current (IL) and leakage current (Id) are stabilized, after which other attributes are set in block 96, i.e., the overload value and the lowest value of leakage current for maximum protection.

During normal operation, socket 12 is guarded for leakage current and overload conditions in blocks 98 and 100. To remove power from socket 12 either the load is removed, at which point socket controller 10 returns to the quiescent state, or it is switched off by the off button 62. In the latter case, microprocessor 25 causes socket 12 to shut off at the first zero current crossing as detected by current zero cross detector 27, thus eliminating any sparking due to back EMF of inductive loads. If the electrical plug of a connected load appliance has not been removed once the off button 62 was depressed, the on button 60 may be used to restore socket controller 10 to operation as though a load has been connected to connectors 14 for the first time.

Also during normal operation, the power switch 26 is monitored for thermal conditions obtaining on the heat sink of the power TMOS transistors. Thermal monitoring signal an6 (see FIG. 1) is tested, as shown in FIG. 7, in block 102 to ensure that the external surface of the heat sinks does not reach approximately 70 degrees Celsius, otherwise power switch 26 is switched to the "OFF" state. This could be caused by poor contact between the load and socket connectors 14.

Once block 104 confirms the continued presence of a load, a loop is formed and repetition of the tests performed in blocks 98, 100 and 102 continues. If these conditions are maintained satisfactory, power switch 26 remains in the "ON" state as this loop continues to be monitored. If, however, the load is disconnected, block 104 detects the absence of load current and transfers control to block 106 which turns power switch 26 to the "OFF" state, after which operation returns to block 87 and waits for a load to be connected.

As shown in FIGS. 8A–8B, the false load detection operation begins in block 108, where a check is made to see if the output voltage Vw is equal at symmetrical points in the positive and negative portions of the system voltage, or whether the load has polarity. Examples of these types of loads include electronic circuits in which a rectifier produces a DC voltage which is smoothed by a filter capacitor for use by internal circuits (radio, TV, etc.).

If the output voltage Vw is not symmetrical, which means that the load cannot be a human being, operation branches to block 94, turning "ON" power switch 26. If however, the output voltage is symmetrical, the possibility exists that a human load is present, and the false load detection operation continues in block 110 to check whether the output voltage waveform is a sine wave. This is accomplished by sampling output voltage Vw at predetermined intervals, normalizing these values and comparing the acquired profile to characteristic sine wave data stored in the ROM. If the comparison shows that it is not a sine wave, operation branches to block 94 for power switch energization.

Otherwise, the operation continues to block 112 where the load impedance Z is checked to see whether it is smaller than Zh, a minimum value for human impedance. This value may be established by reference to medical literature, where it is generally recognized as being in the range of several hundred ohms. For additional safety, this value may be chosen below the minimum recognized value, such as 100 ohm. If the measured value is below Zh, operation branches to block 94.

If the impedance measurement is not below Zh, operation continues in block 114 where the phase shift between load voltage and current is measured. In block 116, examination of the measured phase shift $\Phi$ is performed to determine whether it lies in the range of $\Phi < \phi < 45$. In accordance with the principles of the present invention, it has been determined by the inventors that a human being can only exhibit a value inside this range. Values lower than zero represent an inductive load, and are definitely not those of a human being, while values beyond the upper limit of this range cannot be exhibited by a human being.

If the phase shift is outside this range, operation branches to block 94. If however, the phase shift is inside this range, operation continues in block 118 (FIG. 8B and 8A), which is the first step in the residual voltage detection routine. This routine is performed once for the positive portion of the system voltage sine wave, and once for the negative portion. An internal parameter P is used to track the appropriate routine variables.

Initially, P is set positive in block 118, and the excitation pulse is applied. After this, switch S1 is closed in block 120 for the P half cycle. In block 122, the residual voltage is measured at the end of the P half cycle (Vrp). In block 124, provision is made for a case where the load contains an internal battery, such that the residual voltage is biased, and is not a true reading. In order to overcome this problem, Vrp must be of the same sign as the excitation pulse, and if block 124 detects a different sign between Vrp and P, Vrp is set to zero at block 126. Otherwise, the residual voltage value is recorded, and operation proceeds in block 128, where it is determined if both portions of the system voltage have been applied in the residual votage detection routine. If not, P is set negative in block 130, and the routine is repeated from block 122.

Once two values of Vrp corresponding to the positive and negative portions of the system voltage are available, operation proceeds in block 132, where switch S1 is opened. In block 134, the difference in the Vrp values is obtained (Vr) and compared with a threshold value, Vrh. Depending on the result of this comparison, where a "yes" means that it is a human load and a "no" means it is not, operation branches to one of respective blocks 87 or 94.

A feature of the present invention is the ability to control power switch 26 in a PWM (pulse width modulation) mode, by addition of a software routine between blocks 96 and 98 of FIG. 7, such that a lower output voltage Vw is obtained with respect to the input system voltage Vin. In addition, a "soft start" function can be provided by which the output voltage Vw is applied to the load in a gradual, controlled fashion. This is useful with illumination loads, such as filament lamps.

As stated in the background of the invention, the existing design of differential circuit breakers is inadequate with respect to its response to leakage current. As contrasted with these designs, the inventive safety electrical socket controller operation allows a better measurement of the leakage current. This is because the leakage current is monitored in the standby mode before energization, and is monitored continuously after energization, allowing greater precision in matching the threshold values to one socket 12 characteristic, with much higher sensitivity.

In addition, since the power switch 26 is a solid-state device, a faster response is achieved than in existing designs. Controller 10 also achieves higher reliability over mechanical arrangements. With regard to speed of response, 200 microseconds elapse between leakage current detection and actual power switch 26 cut-off. Due to this speed of response, when an actual load is connected, even if a person touches socket 12 connectors, or a live wire of the connecting electrical cord, or the housing of a faulty appliance, he will not feel the electrical shock he would otherwise receive. Thus, the level of safety is approximately 5 times better than the existing differential circuit breaker designs, and the speed of response is about 1000 times faster.

It will be appreciated by those skilled in the art that the inventive safety electrical socket controller 10 can be applied as a direct substitution to an existing differential circuit breaker (Siemens "Schutzschalter"), also known as an earth leakage circuit breaker. This is accomplished by adding a series relay contactor on the line side of power switch 26, to fulfill the requirement of electrical standards calling for an air gap in the breaker device. In this arrangement, gate signals 41a-b are provided to both the relay contactor coil and power switch 26. When a leakage current condition is detected by controller 10, power switch 26 will turn off before the contactor. Thus, speed of response is not sacrificed, and the required physical isolation is assured. Moreover, since the electrical contactor in this arrangement operates on line voltage, there is no need for a "mechanical amplifier" using stored spring energy as in prior art designs, and a higher reliability is achieved.

Having described the invention with regard to certain specific embodiments thereof, it is to be understood that the description is not meant as a limitation since further modifications will now suggest themselves to those skilled in the art and it is intended to cover such modifications as fall within the scope of the appended claims.

We claim:

1. Programmable safety electrical socket controller apparatus comprising:

means for connecting a load to the socket;

means connected to said connecting means for measuring, in a standby mode, a set of electrical characteristics associated with the load;

means for converting said set of electrical characteristics to a group of data values;

processor means for receiving and examining said group of data values and, in response thereto, generating a switching signal corresponding to an energization mode; and power switching means responsive to said switching signal for applying electrical power to said connecting means for use by said load in said energization mode;

said processor means being programmed so as to generate said switching signal for controlling a transition of said power switching means between said standby and energization modes, in response to whether said group of data values indicates a presence of electrical characteristics consistent with those of an actual electrical load.

2. The controller apparatus of claim 1 wherein said load connecting means comprises at least a pair of electrical socket connectors.

3. The controller apparatus of claim 1 wherein said measuring means comprises a set of analog amplifiers for providing said electrical characteristics to an A/D converter for providing said group of data values.

4. The controller apparatus of claim 1 wherein said processor means comprises a microprocessor programmed to determine said switching signal in said standby and energization modes corresponding to "OFF" and "ON" states of said power switching means.

5. The controller apparatus of claim 1 wherein said power switching means comprises a pair of TMOS transistors.

6. The controller apparatus of claim 1 wherein said power switching means comprises a solid-state device and a series-connected relay contactor.

7. The controller apparatus of claim 1 wherein said processor means, during operation in said standby mode, examines said group of data values for existence of pre-defined leakage current conditions so as to prevent transition of said power switching means from said standby to said energization modes.

8. The controller apparatus of claim 1 wherein said processor means, during operation in said standby mode, examines said group of data values for existence of pre-defined overload conditions so as to prevent transition of said power switching means from said standby to said energization modes.

9. The controller apparatus of claim 1 wherein said processor means, during operation in said energization mode, examines said group of data values for existence of pre-defined leakage current conditions so as to de-energize said power switching means.

10. The controller apparatus of claim 1 wherein said processor means, during operation in said energization modes, examines said group of data values for existence of at least one of short-circuit or overload conditions so as to de-energize said power switching means.

11. The controller apparatus of claim 1 wherein said group of data values includes thermal data associated with operation of said power switching means in said energization mode and wherein said processor means is programmed to monitor said thermal data and accordingly determine said switching signal for safe operation.

12. The controller apparatus of claim 1 wherein said processor means, during operation in said energization mode, examines said group of data values for existence of surge voltage conditions so as to de-energize said power switching means.

13. The controller apparatus of claim 1 wherein said processor means, during operation in said energization mode, examines said group of data values for zero crossings of current supplied to said load, and where required, generates said switching signal for de-energization of said power switching means in accordance therewith so as to avoid generation of a spark associated with inductive loads.

14. The controller apparatus of claim 1 wherein said switching signal is determined by said processor means in accordance with a pulse width modulation technique so as to gradually apply electrical power to said connected load during transition from said standby to said energization mode.

15. The controller apparatus of claim 1 wherein said group of data values includes a residual voltage appearing across said connected load after one of a series of excitation pulses has been applied thereto and a predetermined period has elapsed before application of another excitation pulse.

16. The controller apparatus of claim 15 wherein said residual voltage is compared with a threshold value stored in a memory location of said processing means wherein said stored threshold value is associated with pre-programmed values of impedance measurements of a human being as the load.

17. Programmable safety electrical socket controller apparatus for use with an electrical socket, said apparatus comprising:
means connected to the electrical socket for measuring, in a standby mode, a set of electrical characteristics associated with a load connected to the socket;
means for converting said set of electrical characteristics to a group of data values;
processor means for receiving and examining said group of data values and, in response thereto, generating a switching signal corresponding to an energization mode; and
power switching means responsive to said switching signal for applying electrical power to the electrical socket for use by said load in said energization mode,
said processor means being programmed so as to generate said switching signal for controlling a transition of said power switching means between said standby and energization modes depending upon whether said group of data values indicates a presence of electrical characteristics consistent with those of an actual electrical load.

18. A method of applying power to a load connected at a safety electrical socket, said method comprising the steps of:
measuring, in a standby mode, a set of electrical characteristics associated with the load;
converting said set of electrical characteristics to a group of data values;
receiving and examining said group of data values and, in response thereto, generating a switching signal corresponding to an energization mode; and
applying electrical power to the load in said energization mode in response to said switching signal, wherein said switching signal, in response to whether said group of data values indicates a presence of electrical characteristics consistent with those of an actual electrical load, causes a transition between said standby and energization modes.

19. The method of claim 18 wherein said group of data values includes a residual voltage appearing across the load after one of a series of excitation pulses has been applied thereto and a predetermined period has elapsed before application of another excitation pulse, and wherein said residual voltage is compared with a threshold value associated with predetermined values of impedance measurements of a human being as the load.

20. The method of claim 18 further comprising the step of determining said switching signal in response to a result of a programmed time-dependent control function supplied to the safety electrical socket by communication carried via power line communications from a computer host system.

21. Apparatus for an electrical socket comprising:
a socket;
means for electrically linking a load to the socket;
means, operative in response to a switching signal, for switchably applying power to said linking means and therethrough to said load;
means connected to said linking means for measuring at least one electrical characteristic associated with said load while an appreciable amount of said power is not being applied by said applying means to said linking means and, in response thereto, forming a plurality of measured data values; and
control means, responsive to said measured data values, for producing said switching signal and for determining whether said measured data values indicate that said load is an actual electrical load and, in response therto, for changing said switching signal from a first to a second state such that whenever said measured data values are not inconsistent with corresponding pre-defined values of said characteristic for the actual electrical load said applying means switchably applies an appreciable amount of electrical power to said linking means for application therethrough to said load.

22. The apparatus of claim 21 wherein said linking means comprises at least a pair of electrical in said socket.

23. The apparatus of claim 21 wherein said control means examines said measured data values for existence of pre-defined leakage current conditions so as to prevent said switching signal from changing to said second state such that said power applying means does not switchably apply said appreciable amount of power to said linking means.

24. The apparatus of claim 21 wherein said control means examines said measured data values for existence of pre-defined overload conditions so as to prevent said switching signal from changing to said second state such that said power applying means does not switchably apply said appreciable amount of power to said linking means.

25. The apparatus of claim 21 wherein said control means examines said measured data values for existence of pre-defined leakage current conditions so as to change said switching signal from said second to said first state thereby de-energizing said power applying means.

26. The apparatus of claim 21 wherein said control means examines said measured data values for existence of at least one of short-circuit or overload conditions so as to change said switching signal from said second to said first state thereby de-energizing said power applying means.

27. The apparatus of claim 21 wherein said control means examines said measured data values for existence of surge voltage conditions so as to change said switching signal from said second to said first state thereby de-energizing said power applying means.

28. The apparatus of claim 21 wherein said control means, examines said measured data values for zero crossings of current supplied to said load, and where. required, changes said switching signal from said second to said first state thereby de-energizing said applying means so as to avoid generation of a spark associated with an inductive load.

29. the apparatus of claim 21 wherein said measured charcteristic comprises a residual voltage appearing across said load after one of a series of excitation pulses has been applied thereto and a predetermined period has elapsed.

30. The apparatus of claim 29 wherein said residual voltage is compared with a threshold value stored in a memory location of said control means wherein said stored threshold value is associated with pre-programmed values of impedance measurements of a human being as the load.

31. A method of operating an electrical safety socket having a socket, means for electrically linking a load to the socket and means, operative in response to a switching signal, for switchably applying power to said linking means and therethrough to said load, said method comprising the steps of:
  measuring at least one electrical characteristic associated with said load while an appreciable amount of said power is not being applied by said applying means to said linking means;
  forming, in response to said measuring step, a plurality of measured data values;
  determining, in response to said measured data values, whether said load is an actual electrical load; and
  changing, in response to said determining step, said switching signal from a first to a second state such that whenever said measured data values are not inconsistent with corresponding pre-defined values of said characteristic for the actual electrical load an appreciable amount of electrical power is switchably applied, in response to said switching signal, through said applying means to said linking means for application therethrough to said load.

32. The method of claim 31 wherein said measured characteristic comprises a residual voltage appearing across said load after one of a series of excitation pulses has been applied thereto and a predetermined period has elapsed.

33. The method of claim 32 further comprising the step of comparing measured data values for said residual voltage with a threshold value, said threshold value being associated with pre-programmed values of impedance measurements of a human being as the load.

34. The method of claim 31 further comprising the step of examining said measured data values for existence of pre-defined leakage current conditions so as to prevent said switching signal from changing to said second state such that said power applying means does not switchably apply said appreciable amount of power to said linking means.

35. The method of claim 31 further comprising the step of examining said measured data values for existence of pre-defined overload conditions so as to prevent said switching signal from changing to said second state such that said power applying means does not switchably apply said appreciable amount of power to said linking means.

36. The method of claim 31 further comprising the step of examining said measured data values for existence of pre-defined leakage current conditions so as to change said switching signal from said second to said first state thereby de-energizing said power applying means.

37. The method of claim 31 further comprising the step of examining said measured data values for existence of at least one of short-circuit or overload conditions so as to change said switching signal from said second to said first state thereby de-energizing said power applying means.

38. The method of claim 31 furhter comprising the step of examining said measured data values for existence of surge voltage conditions so as to change said switching signal from said second to said first state thereby de-energizing said power applying means.

39. The method of claim 31 further comprising the steps of:
  examining said measured data values for zero crossings of current supplied to said load, and
  changing said switching signal, in response to said zero crossings, from said second to said first state thereby de-energizing said applying means so as to avoid generation of a spark associated with an inductive load.

40. The method of claim 31 further comprising the step of generating said switching signal in response to a result of a programmed time-dependent control function supplied to the safety electrical socket by communication carried via power line communications from a computer host system.

41. Apparatus for detecting whether an object in contact with at least two electrical connections is a living human being, said apparatus comprising:
  means for applying a pre-defined excitation pulse across the electrical connections;
  means for measuring a residual voltage appearing across said connections after a sufficient pre-defined amount of time has elapsed so as to allow a substantial portion of any expected stored energy, which results from said excitation pulse and is contained within an electrical load whenevr that load appears as said object, and which produces a discharge voltage across said connections to dissipate, whether said discharge voltage decreases to approximately zero;
  means for determining whether said measured residual voltage is non-zero with a magnitude approximately equal to that of a voltage produced by electrolytic action of living human body tissue; and
  means, responsive to said determining means, for producing an indication as to whether said object is or is not a human body.

42. The apparatus in claim 41 further comprising:
  means for successively applying first and second excitation pulses respectively having first and second polarities across said electrical connections;

means for measuring first and second residual voltages appearing across said contacts after the sufficient pre-defined amount of time has elapsed after each such pulse so as to yield first and second residual voltage measurements;

means for determining a difference between said first and second residual voltage measurements; and means for determining if said difference exceeds a pre-defined threshold value.

43. The apparatus in claim 42 further comprising means for setting either said first or second residual voltage measurement to zero if that measurement has a different polarity than the excitation pulse associated therewith.

44. In apparatus for detecting whether an object in contact with at least two electrical connections is a living human being, a method comprising the steps of:

applying a pre-defined excitation pulse across the electrical connections;

measuring a residual voltage appearing across said connections after a sufficient pre-defined amount of time has elapsed so as to allow a substantial portion of any expected stored energy, which results from said excitation pulse and is contained within an electrical load whenever that load appears as said object and which produces a discharge voltage across said connections, to dissipate, whereby said discharge voltage decreases to approximately zero;

determining whether said measured residual voltage is non-zero with a magnitude approximately equal to that of a voltage produced by electrolytic action of living human body tissue; and producing, in response to said determining step, an indication as to whether said object is or is not a human body.

45. The method in claim 44 further comprising the steps of:

successively applying first and second excitation pulses respectively having first and second polarities across said electrical connections;

measuring first and second residual voltages appearing across said contacts after a sufficient pre-defined amount of time has elapsed after each such pulse to allow substantially all the stored electrical energy associated with an electrical load, if appearing as said object, to decrease to approximately zero after each of said pulses has been applied across said connections so as to yield first and second residual voltage measurements;

determining a difference between said first and second residual voltage measurements; and determining if said difference exceeds a pre-defined threshold value.

46. The apparatus in claim 45 further comprising the step of setting either said first or second residual voltage measurements to zero if that measurement has a different polarity than the excitation pulse associated therewith.

* * * * *